US007014899B2

(12) United States Patent
Chen et al.

(10) Patent No.: US 7,014,899 B2
(45) Date of Patent: *Mar. 21, 2006

(54) ROLLER FOR USE IN A FUSING STATION

(75) Inventors: Jiann-Hsing Chen, Fairport, NY (US); Joseph A. Pavlisko, Pittsford, NY (US); Muhammed Aslam, Rochester, NY (US); Po-Jen Shih, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,996

(22) Filed: Sep. 22, 2003

(65) Prior Publication Data

US 2004/0121255 A1 Jun. 24, 2004

Related U.S. Application Data

(60) Provisional application No. 60/435,060, filed on Dec. 20, 2002.

(51) Int. Cl.

| | |
|---|---|
| ***B32B 1/08*** | (2006.01) |
| ***B32B 25/02*** | (2006.01) |
| ***B32B 25/08*** | (2006.01) |
| ***B32B 25/20*** | (2006.01) |
| ***G03G 15/20*** | (2006.01) |

(52) U.S. Cl. ............... 428/36.8; 428/36.91; 428/313.5; 428/325; 428/328; 428/329; 428/421; 428/447; 428/448; 399/333; 492/56

(58) Field of Classification Search ................ 399/333; 492/56; 428/36.8, 36.91, 313.5, 315.9, 325, 428/328, 329, 421, 447, 448

See application file for complete search history.

(56) References Cited

U.S. PATENT DOCUMENTS

| | | | |
|---|---|---|---|
| 3,615,972 A | 10/1971 | Morehouse, Jr. et al. | 156/79 |
| 3,914,360 A | 10/1975 | Gunderman et al. | 264/51 |
| 4,513,106 A | 4/1985 | Edgren et al. | 521/58 |
| 4,984,027 A | 1/1991 | Derimiggio et al. | 399/331 |
| 5,292,606 A | 3/1994 | Fitzgerald | 428/35.8 |
| 5,336,539 A | 8/1994 | Fitzgerald | 428/36.8 |
| 5,450,183 A | 9/1995 | O'Leary | 399/321 |
| 5,464,698 A | 11/1995 | Chen et al. | 428/421 |

(Continued)

OTHER PUBLICATIONS

Hawley's condensed Chemical Dictionary, 13th Edition, p. 995, Jan. 1999.

(Continued)

*Primary Examiner*—Ramsey Zacharia
(74) *Attorney, Agent, or Firm*—Carl F. Ruoff

(57) ABSTRACT

A fusing-station member, which member can be a compliant fuser roller or a compliant pressure roller, for use in a fusing station of an electrostatographic machine, and which member includes a base cushion layer formed on a core member, with the base cushion layer coated by a thin protective gloss control layer. In certain preferred embodiments, the base cushion layer is a highly cross-linked condensation-polymerized polyorganosiloxane material made by thermal curing of a formulation which includes three types of filler particles, namely hollow flexible microballoon particles, strength-enhancing solid particles, and thermal-conductivity-enhancing solid particles. In other preferred embodiments, expandable microspheres are included in lieu of the hollow flexible microballoon particles in an otherwise similar uncured formulation, which expandable microspheres are transformed into expanded hollow microballoon particles during the thermal curing.

34 Claims, 5 Drawing Sheets

U.S. PATENT DOCUMENTS

| | | | | |
|---|---|---|---|---|
| 5,480,724 | A | 1/1996 | Fitzgerald et al. | 428/447 |
| 5,595,823 | A | 1/1997 | Chen et al. | 428/421 |
| 5,599,631 | A * | 2/1997 | Chen et al. | 428/421 |
| 5,654,052 | A | 8/1997 | Visser et al. | 428/35.8 |
| 5,716,714 | A | 2/1998 | Chen et al. | 428/473.5 |
| 5,754,931 | A | 5/1998 | Castelli et al. | 399/297 |
| 5,916,671 | A | 6/1999 | Dauber et al. | 428/317.3 |
| 6,190,771 | B1 | 2/2001 | Chen et al. | 428/375 |
| 6,224,978 | B1 | 5/2001 | Chen et al. | 428/376 |
| 6,225,409 | B1 | 5/2001 | Davis et al. | 525/104 |
| 6,235,801 | B1 | 5/2001 | Morales et al. | 521/54 |
| 6,261,214 | B1 | 7/2001 | Meguriya | 492/56 |
| 6,355,352 | B1 | 3/2002 | Chen et al. | 428/421 |
| 6,361,829 | B1 | 3/2002 | Chen et al. | 427/380 |
| 6,429,249 | B1 | 8/2002 | Chen et al. | 524/432 |
| 6,486,441 | B1 * | 11/2002 | Chen et al. | 219/216 |
| 6,490,430 | B1 | 12/2002 | Chen et al. | 399/333 |
| 2002/0102410 | A1 | 8/2002 | Gervasi et al. | 428/421 |

OTHER PUBLICATIONS

Office Action for copending Application No. 10/667,548, mailed Sep. 7, 2004.

Office Action for copending Application No. 10/668,014, mailed Sep. 9, 2004.

Office Action for copending Application No. 10/667,781, mailed Sep. 9, 2004.

* cited by examiner

ROLLER FOR USE IN A FUSING STATION

This application claims the benefit of Provisional application Ser. No. 60/435,060, filed Dec. 20, 2002.

FIELD OF THE INVENTION

The invention relates to electrostatography and to a fusing-station roller and method of making, and in particular to a conformable roller which includes a highly cross-linked condensation-polymerized polydimethylsiloxane incorporating both hollow fillers and solid fillers.

BACKGROUND OF THE INVENTION

In electrostatographic imaging and recording processes such as electrophotographic printing, an electrostatic latent image is formed on a primary image-forming member such as a photoconductive surface and is developed with a thermoplastic toner powder to form a toner image. The toner image is thereafter transferred to a receiver member, e.g., a sheet of paper or plastic, and the toner image is subsequently fused or fixed to the receiver member in a fusing station using heat and/or pressure. The fusing station includes a heated fuser member, which can be a roller, belt, or any surface having a suitable shape for fixing thermoplastic toner powder to the receiver member. Fusing typically involves passing the toned receiver member between a pair of engaged rollers that produce an area of pressure contact known as a fusing nip. In order to form the fusing nip, at least one of the rollers typically includes a compliant or conformable layer. Heat is transferred from a heated roller fuser member to the toner in the fusing nip, causing the toner to partially melt and attach to the receiver member.

Typically included in a compliant heated fuser member roller is a resilient or elastically deformable base cushion layer (e.g., an elastomeric layer). The base cushion layer is usually covered by one or more concentric layers, including a protective outer layer. The base cushion layer is normally bonded to a core member included in the roller, with the roller having a smooth outer surface. Where the fuser member is in the form of a belt, e.g., a flexible endless belt that passes around the heated roller, it commonly has a smooth outer surface which may also be hardened. Similarly, a resilient base cushion layer can be incorporated into a deformable pressure roller used in conjunction with a relatively hard fuser roller.

Simplex fusing stations attach toner to only one side of the receiver member at a time. In this type of station, the engaged roller that contacts the unfused toner is commonly known as the fuser roller and is a heated roller. The roller that contacts the other side of the receiver member is known as the pressure roller and is usually unheated. Either or both rollers can have a compliant layer on or near the surface. It is common for one of these rollers to be driven rotatably by an external source while the other roller is rotated frictionally by the nip engagement.

In a duplex fusing station, which is less common, two toner images are simultaneously attached, one to each side of a receiver passing through a fusing nip. In such a duplex fusing station there is no real distinction between fuser roller and pressure roller, both rollers performing similar functions, i.e., providing heat and pressure.

It is known that a resilient fuser roller, when used in conjunction with a harder or relatively non-deformable pressure roller, e.g., in a Digimaster 9110 machine manufactured by Heidelberg Digital L.L.C., located in Rochester, N.Y., provides easy release of a receiver member from the fuser roller, because the distorted shape of the compliant surface in the nip tends to bend the receiver member towards the relatively non-deformable unheated pressure roller and away from the much more deformable fuser roller. On the other hand, when a conformable or compliant pressure roller is used to form the fusing nip against a hard fuser roller, such as in a DocuTech 135 machine manufactured by Xerox Corporation, located in Rochester, N.Y., a mechanical device such as a blade is typically necessary as an aid for releasing the receiver member from the fuser roller.

A deformable fuser roller or pressure roller for use in a fusing station is advantageously provided with a fluorothermoplastic random copolymer outermost coating, as disclosed in U.S. Pat. No. 6,355,352, in the name of Chen, et al., which is hereby incorporated by reference.

The most common type of fuser roller is internally heated, i.e., a source of heat is provided within the roller for fusing. Such a fuser roller, which is included in the subject invention, generally has a hollow core member, inside of which is located a source of heat, usually a lamp. Surrounding the core member can be an elastomeric layer through which heat is conducted from the core member to the surface, and the elastomeric layer typically contains fillers for enhanced thermal conductivity.

A conventional toner fuser roller includes a rigid cylindrical core member, typically metallic such as aluminum, coated with one or more synthetic layers usually formulated with polymeric materials made from elastomers. An elastically deformable or resilient base cushion layer, which may contain filler particles to improve mechanical strength and/or thermal conductivity, is typically formed on the surface of the core member, which core member may advantageously be coated with a primer to improve adhesion of the resilient layer. Roller cushion layers are commonly made of silicone rubbers or silicone polymers such as, for example, polydimethylsiloxane (PDMS) polymers disclosed, e.g., by U.S. Pat. No. 6,224,978, in the name of Chen, et al., which is hereby incorporated by reference.

An internally heated fuser roller is typically made using a condensation-polymerized silicone rubber material, such as for example used in a NexPress 2100 digital color press, manufactured by NexPress Solutions, LLC, located in Rochester, N.Y. A suitable condensation-polymerized polyorganosiloxane material is for example made from a formulation sold by Emerson & Cuming Composite Materials, Inc., located in Billerica, Mass., under the trade name EC4952, which formulation includes strength-enhancing solid filler particles and thermal-conductivity-enhancing solid filler particles in high concentration.

Some roller fusers rely on film splitting of a low viscosity oil to enable release of the toner and (hence) receiver member from the fuser roller. The release oil is typically applied to the surface of the fuser from a donor roller coated with the oil provided from a supply sump. A donor roller is for example disclosed in U.S. Pat. No. 6,190,771, in the name of Chen, et al., which is hereby incorporated by reference.

Release oils (commonly referred to as fuser oils) are composed of, for example, polydimethylsiloxanes. When applied to the fuser roller surface to prevent the toner from adhering to the roller, fuser oils may, upon repeated use, interact with PDMS material included in the resilient layer(s) in the fuser roller, which in time can cause swelling, softening, and degradation of the roller. To prevent these deleterious effects caused by release oil, a thin barrier layer made of, for example, a cured fluoroelastomer and/or a silicone elastomer, is typically formed around the resilient cushion layer, as disclosed in U.S. Pat. No. 6,225,409, in the name of Davis, et al., along with U.S. Pat. Nos. 5,464,698 and 5,595,823, both in the name of Chen, et al. A fluorothermoplastic random copolymer outermost coating can also be used for this purpose, as disclosed in U.S. Pat. Nos. 6,355,352 and 6,361,829, both in the name of Chen, et al.

To rival the photographic quality produced using silver halide technology, it is desirable that electrostatographic multicolor toner images have high gloss. To this end, it is desirable to provide a very smooth fusing member contacting the toner particles in the fusing station. A fuser roller having improved gloss characteristics is disclosed in U.S. patent application Ser. No. 09/608,290, in the name of Chen, et al. A fluorocarbon thermoplastic random copolymer useful for making a gloss control coating on a fuser roller is disclosed in U.S. Pat. No. 6,429,249, in the name of Chen, et al., which is hereby incorporated by reference.

In the fusing of the toner image to the receiver member, the area of contact of a conformable fuser roller with the toner-bearing surface of a receiver member sheet as it passes through the fusing nip is determined by the amount pressure exerted by the pressure roller and by the characteristics of the resilient cushion layer. The extent of the contact area helps establish the length of time that any given portion of the toner image will be in contact with and heated by the fuser roller. It is generally advantageous to increase the contact time by increasing the contact area so as to result in a more efficient fusing process. However, unless the effective modulus for deforming a compliant roller in the nip is sufficiently low, high nip pressures are required to obtain a large nip area. Such high pressures can be disadvantageous and cause damage to a deformable roller, e.g., such as pressure set or other damage caused by edges of thick and/or hard receiver members as they enter or leave the nip. Hence a low modulus deformable roller is desirable.

It is known from U.S. Pat. No. 5,716,714, in the name of Chen, et al., that use of a relatively soft deformable fusing-station roller (e.g., a deformable pressure roller having a low effective modulus for deformation) can advantageously reduce the propensity of a fusing station nip to cause wrinkling of receiver members passing through the nip.

One way to try to create a low modulus fusing-station roller is to use a foamed material, e.g., a cured material having an open-cell or a closed-cell foam structure, with the material inclusive of suitable strengthening and/or thermal-conductivity-enhancing fillers. Attempts to utilize such foamed materials, for example as base cushion layers, have not generally been successful, for a number of reasons. The thermal conductivity of closed-cell structures, tends to be disadvantageously low, even when squeezed in a fusing nip. Although an open-cell structure can be squeezed relatively flat in a fusing nip, the resilience typically becomes compromised because opposite walls within the foam tend to stick together under the heat and pressure of the nip. Moreover, foamed polymeric materials generally have poor tear strength, and shear strength also tends to be low. As a result, fusing-station rollers incorporating foamed base cushion layers are quite susceptible to damage and tend to age rapidly.

U.S. Pat. No. 5,654,052, in the name of Visser, et al., discloses a conformable fusing-station roller including a cured outer layer of silicone rubber inclusive of thermal-conductivity-enhancing fillers, the fusing performance as measured by a crack width test being improved by incorporation of about 0.5%–1.0% by weight (w/w) of a medium viscosity unreactive silicone oil into the pre-cure formulation of the layer material. It can be inferred (but not stated in this patent) that the added unreactive silicone oil caused improvement of fusing performance by lowering the modulus of the outer layer. Flexing of the outer layer in the fusing nip at the elevated temperatures associated with fusing disadvantageously causes the unbound unreactive silicone oil molecules to continually migrate to the surface, and hence the benefits associated with the added oil slowly disappear as the reservoir of oil within the outer layer eventually becomes exhausted after long usage of the roller.

PDMS cushion layers for an internally heated fuser roller typically include inorganic particulate fillers, such as for example solid fillers made of metals, metal oxides, metal hydroxides, metal salts, and mixtures thereof. U.S. Pat. No. 5,292,606, in the name of Fitzgerald describes fuser roller base cushion layers that contain fillers of particulate zinc oxide and zinc oxide-aluminum oxide mixtures. Similarly, U.S. Pat. No. 5,336,539, in the name of Fitzgerald, describes a fuser roller cushion layer containing dispersed nickel oxide particles. Also, the fuser roller described in U.S. Pat. No. 5,480,724, in the name of Fitzgerald, et al., includes a base cushion layer containing 20 to 40 volume percent of dispersed tin oxide particles.

Filler particles may also be included in a barrier layer. For example, U.S. Pat. No. 5,464,698, in the name of Chen, et al., incorporated herein by reference discloses a toner fuser member having a silicone rubber cushion layer and an overlying barrier layer of a cured fluorocarbon polymer in which is dispersed, a filler including a particulate mixture that includes tin oxide.

U.S. Pat. No. 6,224,978, in the name of Chen, et al., discloses an improved fuser roller including three concentric layers each containing a particulate filler, i.e., a base cushion layer made from a condensation-polymerized PDMS, a barrier layer covering the base cushion made of a cured fluorocarbon polymer, and an outer surface layer made of an addition-polymerized PDMS, with particulate fillers in the layers including one or more of aluminum oxide, iron oxide, calcium oxide, magnesium oxide, tin oxide, and zinc oxide. The barrier layer may include a Viton® elastomer (sold by E.I. du Pont de Nemours and Company) or a Fluorel® elastomer (sold by Minnesota Mining and Manufacturing).

Prior art internally heated conventional fuser rollers typically have one or more synthetic polymeric layers including an elastically deformable or resilient layer such as a base cushion layer surrounding a hollow metallic core member, with a source of heat such as a lamp provided within the hollow core member. Such fuser rollers rely on thermal conductivity through the synthetic layers for conduction of heat from the source of heat to the surface of the roller so as to provide heat for fusing toner particles to receiver members. The thermal conductivity, attainable by the use of one or more suitable particulate fillers, is determined by the filler concentration. The thermal conductivity of most polymers is very low and the thermal conductivity generally increases as the concentration of thermally conductive filler particles is increased. However, if the filler concentration is too high, the mechanical properties of a polymer are usually compromised. For example, the stiffness of the synthetic layers may be increased by too much filler so that there is insufficient compliance to create a wide enough nip for proper fusing. Moreover, too much filler will cause the synthetic layers to have a propensity to delaminate or crack or otherwise cause failure of the roller. Because the mechanical requirements of such an internally heated fuser roller require that the filler concentrations be moderate, the ability of the roller to transport heat is thereby limited. In fact, the total concentration of strength-enhancing and thermal-conductivity-enhancing fillers in prior art, internally heated compliant fuser rollers has reached a practical maximum. As a result, the number of copies that can be fused per minute is limited, and this in turn can be the limiting factor in determining the maximum throughput rate achievable in an electrostatographic printer. There is a need, therefore, to provide an improved fusing station for increasing the number of prints that can be fused per minute, thereby providing opportunity for higher machine productivity.

It is known that certain hollow fillers can be included in an addition-polymerized silicone rubber for the purpose of lowering the thermal conductivity of a deformable fuser roller, as disclosed in U.S. Pat. No. 6,261,214, in the name of Meguriya.

Hollow microballoons are well known and are disclosed for example in U.S. Pat. No. 3,615,972, in the name of Morehouse, et al. Microballoons are made from thermoplastic microspheres, which encapsulate a liquid blowing agent, typically a hydrocarbon liquid. Such microspheres are made in unexpanded form. The walls of the unexpanded microspheres are generally impermeable to the liquid blowing agent, i.e., diffusion of molecules of the liquid blowing agent through the walls is typically negligible. An expanded form of a microsphere, i.e., a microballoon, is obtained by heating an unexpanded microsphere to a suitable temperature so as to vaporize the blowing agent, thereby causing the microsphere to grow to a much larger size. Too high of a heating temperature can result in some loss of internal vapor pressure and a shrinking of the microballoon. Methods for expanding microspheres are disclosed in numerous patents, such as for example in U.S. Pat. No. 3,914,360, in the name of Edgren, et al., and in U.S. Pat. No. 6,235,801, in the name of Morales, et al. Expansion is generally irreversible after cooling, and the expanded microballoon form is stable under normal ambient conditions and can be sold as a dry powder or alternatively as a slurry in a liquid vehicle. Expanded microspheres or microballoons, which are available commercially, can be incorporated into various materials, such as for example to make improved paints or lightweight parts. Unexpanded microspheres are also available commercially for incorporation into various types of materials (e.g., expandable inks) or for manufacture of solid parts, e.g., by thermal curing in a mold so as to expand the microspheres. The walls of certain microsphere particles can include finely divided inorganic particles, e.g., silica particles.

The use of microspheres in a compressible layer of a digital printing blanket carcass is disclosed in U.S. Pat. No. 5,754,931, in the name of Castelli, et al. The microspheres are uniformly distributed in a matrix material, which includes thermoplastic or thermosetting resins.

There remains a need to provide for an electrostatographic machine an improved fusing station having high fusing productivity and/or low fusing pressure in a fusing nip. There is also a need to reduce the frequency of fusing artifacts, such as wrinkling of receiver members passing through the fusing nip.

In particular, there remains a need for an improved internally heated conformable fuser roller for use with a relatively hard pressure roller. Specifically, such an improved fuser roller preferably includes a condensation-polymerized silicone rubber base cushion layer having a thermal conductivity similar to that of comparable prior art externally heated fuser rollers, the improvement shown as a roller which is more conformable, i.e., has a lower modulus than comparable prior art externally heated fuser rollers.

Moreover, there remains a need for an improved conformable pressure roller used in conjunction with a relatively hard fuser roller. A particular need is for an improved pressure roller including a filled silicone rubber base cushion layer.

SUMMARY OF THE INVENTION

The invention provides an improved fusing-station member, incorporating flexible hollow filler particles, for use in a fusing station of an electrostatographic machine. The fusing-station member includes a fuser roller and a pressure roller. The fusing station has a fusing nip wherein a toner image is fixed to a receiver member being moved through the fusing nip. The improved fusing-station member can provide an increased fusing efficiency and/or a reduced frequency of fusing artifacts such as wrinkling of the receiver member.

In one embodiment, the fusing-station member is an internally heated compliant fuser roller forming a fusing nip with a relatively hard pressure roller. The fuser roller includes a core member, a base cushion layer formed around the core member, and a thin protective outer layer coated on the base cushion layer. The base cushion layer is a highly cross-linked condensation-polymerized polyorganosiloxane material made by curing at elevated temperature an uncured formulation which includes a mixture of three types of filler particles, namely hollow flexible microballoon particles, strength-enhancing solid particles, and thermal-conductivity-enhancing solid particles.

In an alternative fuser roller embodiment, unexpanded microspheres in lieu of the hollow flexible microballoon particles are combined with strength-enhancing solid filler particles and thermal-conductivity-enhancing solid filler particles in an uncured polyorganosiloxane formulation for making the base cushion layer.

In another embodiment, the fusing-station member is a compliant pressure roller forming a fusing nip with a relatively hard fuser roller. The pressure roller includes a core member, a base cushion layer formed around the core member, and a thin, protective outer layer coated on the base cushion layer. The base cushion layer is a highly cross-linked condensation-polymerized polyorganosiloxane material made by curing at elevated temperature an uncured formulation which includes filler particles in the form of hollow flexible microballoon particles combined with strength-enhancing solid filler particles and thermal-conductivity-enhancing solid filler particles.

In an alternative pressure roller embodiment, unexpanded microspheres in lieu of the hollow flexible microballoon particles are combined with strength-enhancing solid filler particles and thermal-conductivity-enhancing solid filler particles in an uncured polyorganosiloxane formulation for making the base cushion layer.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings in which the relative relationships of the various components are illustrated. For clarity of understanding of the drawings, relative proportions depicted or indicated of the included elements may not be representative of the actual proportions, and some of the dimensions may be selectively exaggerated.

DETAILED DESCRIPTION OF THE PREFERRED EMBODIMENTS

Figure 1:
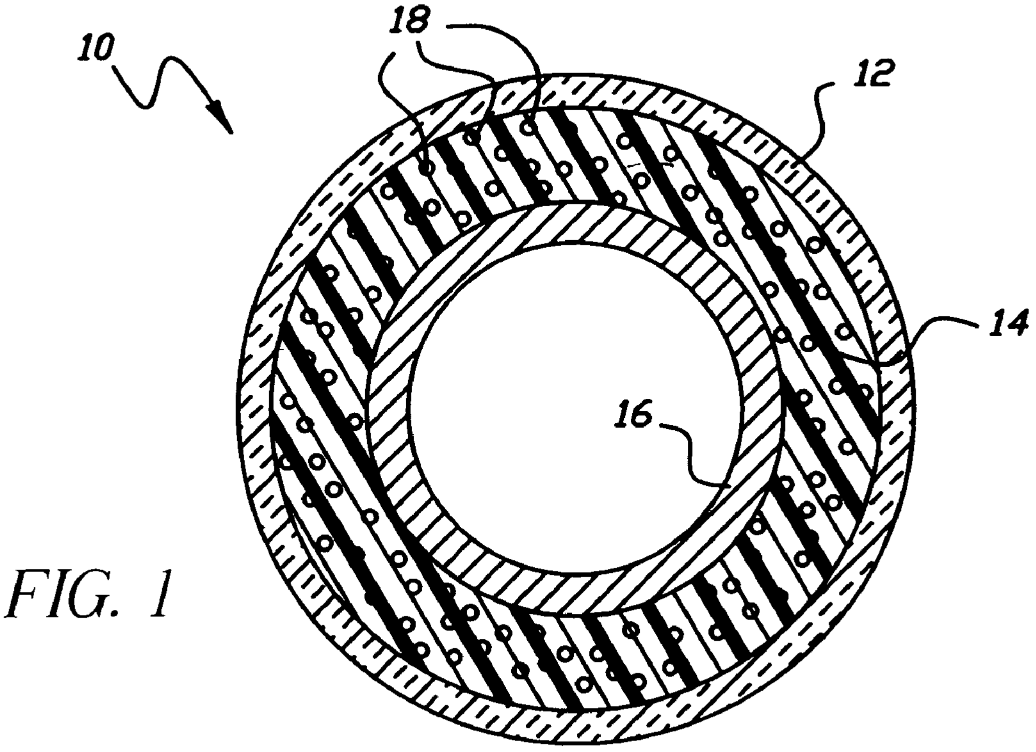
FIG. 1 shows a cross-sectional view of a fusing-station roller in the form of a fuser roller of the invention.

Fusing stations and fusing-station rollers for use therein according to this invention are readily includable in typical electrostatographic reproduction or printing machines of many types, such as for example electrophotographic color printers.

The invention relates to an electrostatographic machine for forming a toner image on a receiver member and utilizing a fusing station for thermally fusing or fixing the unfused toner image to the receiver member, e.g., a paper or a plastic sheet. The fusing station, which includes a heated fuser member forming a fusing nip with a pressure member, applies heat and pressure to fix the unfused toner image carried on the receiver member as the receiver member is moved through the fusing nip. At least one of the fuser member and the pressure member is a compliant or elastically deformable member. The compliant member can be a roller, belt, or any surface having a suitable deformable shape useful for fixing thermoplastic toner powder to the receiver member. A fuser member and a pressure member are referred to herein as fusing-station members, e.g., fusing-station rollers. One of a fusing-station fuser roller and a fusing-station pressure roller is preferably a compliant roller and the other a relatively hard roller.

In certain embodiments, the fusing station includes a compliant internally heated deformable fuser roller for use with a relatively hard pressure roller. In other embodiments, the fusing-station roller is a compliant deformable pressure roller for use with a relatively hard fuser roller, which hard fuser roller can be externally heated or internally heated as may be suitable. An important feature of these deformable fuser roller embodiments and deformable pressure roller embodiments is that each such deformable roller includes a compliant layer preferably incorporating hollow filler particles and at least one type of solid filler particles.

The fusing station preferably includes the fuser roller and the pressure roller in frictional driving relation. Typically, one of the rollers is rotated via a motor, and the other roller is frictionally rotated by engagement in the fusing nip, wherein the fuser roller comes into direct contact with the unfused toner image as the receiver member is moved through the nip. The fuser roller is preferably heated in well-known manner by a dedicated internal source of heat within the roller, such as a lamp, or by any other suitable internal source of heat. The pressure roller, which preferably is not directly heated, is typically indirectly heated to a certain extent via contact in the fusing nip.

Preferably, an oiling mechanism is provided for applying a so-called fuser oil or release oil to the surface of the fuser roller, in well-known manner. For example, the oiling mechanism can be a donor roller mechanism for applying a silicone oil, e.g., from a sump included in the donor roller mechanism. The fuser oil thus applied by the oiling mechanism serves to release a receiver member carrying a fused image from the fuser roller after passage of the receiver member through the fusing nip. The fuser oil is also used for the purpose of preventing so-called offset, whereby melted toner material can be disadvantageously deposited on the fuser roller.

It is preferred for a cleaning station of a known type to be provided for cleaning the surface of the fuser roller. Additionally or alternatively, a cleaning station can be provided for cleaning the surface of the pressure roller.

The toner image in an unfused state may include a single-color toner or it may include a composite image of at least two single-color toner images, e.g., a composite image in full color made for example from superimposed black, cyan, magenta, and yellow single-color toner images. The unfused toner image is previously transferred, e.g., electrostatically, to the receiver member from one or more toner image bearing members such as primary image-forming members or intermediate transfer members. It is well established that for high quality electrostatographic color imaging with dry toners, small toner particles are necessary.

Fusing-station rollers of the invention are suitable for the fusing of dry toner particles having a mean volume weighted diameter in a range of approximately between 2 μm–9 μm, and more typically, about 7 μm–9 μm, but the invention is not limited to these size ranges. The fusing temperature to fuse such particles included in a toner image on a receiver member is typically in a range of 100° C.–200° C., and more usually, 140° C.–180° C., but the invention is not limited to these temperature ranges.

The electrostatographic reproduction or printing may utilize a photoconductive electrophotographic primary image-forming member or a non-photoconductive electrographic primary image-forming member. Particulate dry or liquid toners may be used.

Turning now to FIG. 1, a cross-sectional view of a fusing-station member is illustrated in the form of a fuser roller embodiment of the invention, identified by the numeral 10. Fuser roller 10 is a compliant roller preferably for use with a relatively hard pressure roller. Fuser roller 10 includes a substrate in the form of a core member 16, a base cushion layer 14 formed on the core member, and a protective layer or gloss control layer 12 coated on the base cushion layer. As described in detail below, an important feature of the fuser roller 10 is the presence of flexible hollow filler particles 18 incorporated in the base cushion layer 14.

The core member 16 is preferably rigid and preferably made of a thermally conductive material such as a metal, preferably aluminum, and has a cylindrical outer surface. The core member is typically (but not necessarily) generally tubular, as shown. Preferably an outer diameter of the core member is in a range between about 5 inches and 7 inches, and the outer diameter is more preferably about 6.0 inches. The base cushion layer 14 and the protective or gloss control layer 12 are preferably successively formed on the core member 16 by using suitable coating techniques and successive post-coating curings and grindings as may be necessary. The outer protective layer (gloss control layer) 12 is preferably made of a low surface energy material such as for example a fluorocarbon polymer, and preferably has a very smooth surface suitable for glossing the fused toner image.

Fuser roller 10, when being utilized in a fusing station, is preferably internally heated and forms a fusing nip with a preferably relatively hard pressure roller in well-known fashion (pressure roller and fusing nip not illustrated in FIG. 1). It is important to have a contact width in the fusing nip which is large so as to effect efficient transfer of heat from fuser roller 10 to a toner image carried on a receiver member moved through the nip. Roller 10 (in which base cushion layer 14 includes the flexible hollow filler particles 18 mentioned above) can generally be operated at considerably lower pressure in the fusing nip than an otherwise similar fuser roller having no included flexible hollow filler particles. As a result, fuser roller 10 when operated at such a lower pressure is advantageously less susceptible to being damaged by receiver members passing through the fusing nip than otherwise would be the case at higher pressure. For a reduced pressure mode of operation using the subject fuser roller, a preferred contact width in the fusing nip (measured perpendicular to the fuser roller rotational axis) is in a range of approximately between 13 mm–22 mm. On the other hand, the fuser roller 10 can be operated at higher pressure and thus provide higher fusing throughput rate through the fusing station. For a higher throughput mode of operation using the subject fuser roller with unreduced nip pressure (e.g., at a pressure typically used when the base cushion layer does not include flexible hollow filler particles) the preferred contact width in the fusing nip can be significantly larger, e.g., in a range of approximately between 20 mm–28 mm. It is a feature of the invention that operational fusing pressure and throughput rate can be advantageously traded off against one another for differing fusing requirements as may be suitable. For example, a lower throughput rate can be used with a lower nip pressure for thick receiver members.

Notwithstanding the above-described preference for an internal source of heat for heating of fuser roller 10, an external source of heat can alternatively be used as the primary heat source in conjunction with an intermittently activated internal source of heat.

Base cushion layer (BCL) 14 is a highly cross-linked condensation-polymerized polyorganosiloxane material, preferably a highly cross-linked polydimethylsiloxane material. BCL 14 preferably includes three types of filler particles, namely: flexible, hollow, filler particles; strength-enhancing solid particles, and thermal-conductivity-enhancing solid particles.

Certain preferred embodiments of BCL 14 are made by thermal curing of formulations which include the hollow filler particles as pre-expanded hollow microballoons commercially available as manufactured powders, which pre-expanded hollow microballoons are made from unexpanded microspheres via a thermal expansion process (see U.S. Pat. No. 3,615,972). For these embodiments it is preferred that the uncured formulations exclude unexpanded microspheres. Expanded microballoons for use in the invention are obtainable from Expancel, located in Sundsvall, Sweden and Duluth, Ga. Expancel is a business unit of Casco Products, within Akzo Nobel, in the Netherlands. Flexible microballoon particles included in an uncured organosiloxane formulation for making BCL 14 can have any suitable diameter(s). It is preferred that the included microballoons have diameters of up to approximately 120 micrometers.

Alternative preferred embodiments of BCL 14 incorporating the hollow filler particles are made by thermal curing of alternative formulations which include unexpanded microspheres. The hollow filler particles in these alternative embodiments are formed from the unexpanded microspheres by thermal expansion into microballoons during the curing process at an elevated temperature. Preferably, such alternative uncured formulations (which also include strength-enhancing and thermal-conductivity-enhancing solid particles) exclude expanded microballoons. Varieties of such unexpanded microspheres are available commercially for subsequent thermal expansion during the curing process, which varieties can produce different ranges of expanded sizes after such heating. Unexpanded microspheres for use in uncured formulations are commercially obtainable from Expancel, located in Sundsvall, Sweden and Duluth, Ga. A wide variety of post-curing size distributions of expanded microballoons having at least one distinguishable size can be created in the alternative embodiments of BCL 14 by using one or more varieties of unexpanded microspheres in the uncured alternative base cushion layer formulation.

Elevated temperatures useful for thermally curing BCL 14 preferably exceed 180° C., and more preferably exceed 200° C.

A relatively narrow size distribution of microballoon particles (in pre-expanded form) can be used to make BCL 14. Alternatively, a bimodal distribution or a broad size distribution of microballoon particles can be used. A bimodal distribution can, for example, be made by incorporating two relatively narrow size distributions of expanded microballoons into the uncured formulation. Various sizes of expanded microballoons are commercially available, so that a wide variety of tailored size distributions can be assembled and employed in uncured formulations for making BCL 14.

The walls of microspheres that can be used in uncured formulations for making BCL 14, i.e., microspheres having a form that includes at least one of an expanded microballoon form and an unexpanded microsphere form, are preferably made from a polymeric material polymerized as a homopolymer or as a copolymer from one or more of the following group of monomers: acrylonitrile, methacrylonitrile, acrylate, methacrylate, and vinylidene chloride. However, any suitable monomer may be used.

The walls of expanded microsphere particles or of unexpanded microspheres useful for making BCL 14 can include finely divided solid particles. Inorganic particles, e.g., oxide particles, or any other suitable finely divided inorganic particles, can be included in the walls. Additionally or alternatively, the walls of unexpanded or expanded microspheres may include finely divided organic polymeric particles.

Hereinafter the term "microsphere" refers to both, unexpanded and expanded particles useful in uncured formulations for making BCL 14, and the term "microballoon" generally refers to expanded microspheres. A concentration in an uncured formulation of either unexpanded or expanded microsphere particles is referred to as a microsphere concentration. Predetermined microsphere concentrations in an uncured organosiloxane formulation for making BCL 14 are preferably in a range of approximately between 0.25%–4% by weight (w/w), and more preferably, 0.5%–2% weight (w/w).

Any suitable volume percentage of microspheres may be used in the uncured organosiloxane formulation for making BCL 14. Moreover, at least one distinguishable size of expanded microballoons (or alternatively unexpanded microspheres) can be used, having either one mean size or a combination of sizes. If expanded balloon microspheres are used, the volume percentage in the uncured organosiloxane formulation can be large, preferably in a range of approximately between 30%–90% by volume (v/v).

A preferred concentration by weight of strength-enhancing solid particles (sometimes referred to as structural fillers) in an uncured organosiloxane formulation for making BCL 14 is in a range of approximately between 5%–10% weight (w/w). Any suitable volume percentage of strength-enhancing solid particles may be used in the uncured organosiloxane formulation for making BCL 14.

A preferred concentration by weight of thermal-conductivity-enhancing solid particles in an uncured organosiloxane formulation for making BCL 14 is in a range of approximately between 40%–70% weight (w/w). Any suitable volume percentage of thermal-conductivity-enhancing solid particles may be used in the uncured organosiloxane formulation for making BCL 14.

Strength-enhancing solid filler particles are preferably silica particles, e.g., mineral silica particles or fumed silica particles. Other strength-enhancing solid fillers, which can be included, are particles of zirconium oxide, boron nitride, silicon carbide, and tungsten carbide. The strength-enhancing particles preferably have a mean diameter in a range of approximately between 0.1 micrometer and 100 micrometers, and more preferably, a mean diameter between 0.5 micrometer and 40 micrometers.

Preferred thermal-conductivity-enhancing solid filler particles include particles of aluminum oxide, iron oxide, copper oxide, calcium oxide, magnesium oxide, nickel oxide, tin oxide, zinc oxide, graphite, carbon black, or mixtures thereof. The thermal-conductivity-enhancing particles preferably have a mean diameter in a range of approximately between 0.1 $\mu$m–100 $\mu$m and more preferably, a mean diameter between 0.5 $\mu$m–40 $\mu$m. In a preferred embodiment, BCL 14 includes aluminum oxide thermal-conductivity-enhancing particles.

The base cushion layer 14 preferably has a thermal conductivity in a range of approximately between 0.08 BTU/hr/ft/° F.–0.7 BTU/hr/ft/° F., and more preferably, in a range of approximately between 0.2 BTU/hr/ft/° F.–0.5 BTU/hr/ft/° F.

Base cushion layer 14 preferably has a Shore A durometer in a range of approximately between 30–75, and more preferably, in a range of approximately between 50–70.

Base cushion layer 14 preferably has a thickness in a range of approximately between 0.03 inches–0.30 inches, and more preferably, in a range of approximately between 0.1 inches–0.2 inches.

The gloss control or outer protective layer 12 is preferably formed on the base cushion layer 14 by means of any suitable coating method including ring coating and blade coating. Gloss Control Layer (GCL) 12 preferably has a very smooth surface suitable for glossing the fused toner image is preferably made with any chemically unreactive, low surface energy, flexible, polymeric material suitable for high temperature use, such as for example a fluoropolymer. A preferred polymeric material for inclusion in GCL 12 is a fluorocarbon thermoplastic random copolymer, preferably a copolymer of vinylidene fluoride, tetrafluoroethylene and hexafluoropropylene as disclosed in U.S. Pat. No. 6,355,352 in the name of Chen et al., the fluorocarbon thermoplastic random copolymer having subunits of:

$$—(CH_2CF_2)x\text{-}, —(CF_2CF(CF_3))y\text{-}, \text{ and } —(CF_2CF_2)z\text{-};$$

wherein;

x is from 1 to 50 or from 60 to 80 mole percent;

y is from 10 to 90 mole percent;

z is from 10 to 90 mole percent; and x+y+z equals 100 mole percent.

The gloss control layer 12 may have any suitable thickness and may include one or more particulate fillers. It is preferred that the one or more particulate fillers in GCL 12 include zinc oxide particles and fluoroethylenepropylene (FEP) resin particles. However, in substitution of, or in addition to the aforementioned one or more particulate fillers, any other particulate filler material may be included in gloss control layer 12, either singly or in combination. It is necessary for good glossing of a toner image to keep the filler concentration relatively low and the particle size of the filler small, so that a matte effect on the toner image due to filler particles at the surface of GCL 12 can be minimized. A filler used in the formulation of GCL 12 preferably has a particle size in a range of approximately between 0.1 $\mu$m–10 $\mu$m, and more preferably 0.1 $\mu$m–2.0 $\mu$m. The total concentration of fillers included in gloss control layer 12 is preferably less than about 20% by weight (w/w). Specifically, in a preferred formulation of GCL 12, which includes zinc oxide and FEP resin particles, the concentration of zinc oxide is in a range of approximately between 5%–7% weight (w/w), and the concentration of FEP resin particles is in a range of approximately between 7%–9% weight (w/w). Preferably, the thickness of the gloss control layer 12 is in a range of approximately between 0.001 inches–0.004 inches, and more preferably 0.0015 inches–0.0025 inches. The thermal conductivity of GCL 12 is preferably no less than approximately 0.07 BTU/hr/ft/° F., and more preferably in a range of approximately between 0.08 BTU/hr/ft/° F.–0.11 BTU/hr/ft/° F.

In an alternative embodiment, GCL12 can be a layer made of a fluoroelastomer material, e.g., a Viton® material, as disclosed for example in the U.S. Pat. Nos. 5,464,698 and 5,595,823, both in the name of Chen et al.

As an alternative to fuser roller 10, the fuser member can be in the form of a flexible web (not illustrated). This web is heated for fusing in any suitable way. For example, the web can be pressed against the pressure roller by a heated back-up roller in the fusing station, such that a receiver member is moved between the web and the pressure roller for fixing a toner image thereto. The web preferably includes an elastically deformable or resilient base cushion layer coated on any suitable substrate and subsequently overcoated with any suitable gloss control layer or protective layer, wherein the resilient layer includes flexible hollow filler particles and has a composition preferably similar to that of base cushion layer 14. Thus the resilient layer is made by a suitably catalyzed condensation polymerization, at elevated curing temperatures, of an organosiloxane formulation including microsphere particles (i.e., having a form that includes at least one of an expanded microballoon form and an unexpanded microsphere form) and suitable solid fillers, such as thermal-conductivity-enhancing solid filler particles and strength-enhancing solid filler particles. The organosiloxane formulation used for the flexible web is preferably a dimethylsiloxane formulation.

A preferred relatively hard pressure roller (not illustrated) for use with fuser roller 10 includes a core member with a base cushion layer preferably formed on the core member and a topcoat layer on the base cushion layer. The core member of the relatively hard pressure roller is preferably an aluminum cylinder having an outer diameter in a range between about 3 inches–4 inches. The base cushion layer of the relatively hard pressure roller preferably has a thickness in a range of approximately between 0.18 inches and 0.22 inches. The thermal conductivity of the base cushion layer, while not critical, is preferred to be small enough so as not to drain a critical amount of heat from the fusing nip. A preferred base cushion layer of the relatively hard pressure roller is made of any elastomeric material for use at an elevated temperature, which base cushion layer has a suitable thermal conductivity and a Shore A durometer greater than about 50, preferably greater than about 60. The base cushion layer may include a particulate filler. Preferably, the base cushion layer is made of a highly cross-linked polydimethylsiloxane elastomer. The top-coat layer, preferably having a thickness in a range of approximately between 0.001 inches–0.004 inches, is preferably made of a fluoropolymer, such as for example the fluorocarbon thermoplastic random copolymer of vinylidene fluoride, tetrafluoroethylene and hexafluoropropylene as disclosed in U.S. Pat. Nos. 6,355,352 and 6,429,249, both in the name of Chen, et al. In an alternative embodiment of the relatively hard pressure roller, there is no base cushion layer, the core member being preferably made of any rigid material having a suitably low thermal conductivity and the core member coated with any suitable outer layer such as a wear-resistant layer, the wear-resistant layer preferably made of a polymeric material stable at high temperatures and resistant to damage by fuser oil.

A fusing station including the above-described relatively hard pressure roller and the compliant fuser roller embodiment 10 advantageously provides increased fusing station efficiency (throughput) and greatly reduces a frequency of wrinkling of receiver members passing through the fusing nip. This improved performance is due to a lowered modulus (Shore A durometer) resulting from incorporation of hollow microballoons into base cushion layer 14. In addition to these advantages, fuser roller 10 has a relatively simple construction.

Figure 2:
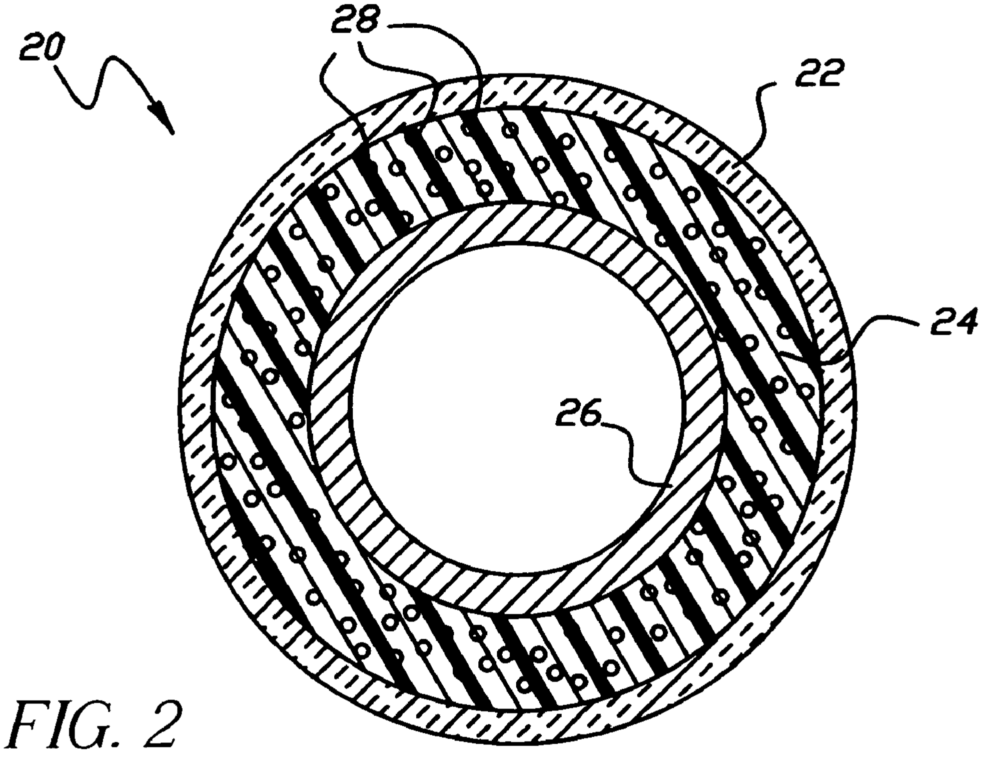
FIG. 2 shows a cross-sectional view of a fusing-station roller in the form of a pressure roller of the invention.

Turning now to FIG. 2, a cross-sectional view of a fusing-station member is illustrated in the form of a pressure roller embodiment of the invention, identified by the numeral 20. Pressure roller 20, which is compliant, is preferably for use with a relatively hard fuser roller. The pressure roller 20 includes a substrate in the form of a core member 26, a base cushion layer 24 formed on the core member, and a protective layer 22 coated on the base cushion layer. In pressure roller 20, flexible hollow filler particles 28 are incorporated in base cushion layer 24.

The core member 26, which has a preferred diameter in a range of approximately between 2.0 inches to 4.0 inches, is otherwise similar to core member 16 of fuser roller embodiment 10.

The base cushion layer 24 of pressure roller 20 is preferably a highly cross-linked condensation-polymerized polyorganosiloxane material. The polyorganosiloxane material of BCL 24 is preferably a polydimethylsiloxane. BCL 24 is made by curing, preferably at temperatures above about 180° C. and more preferably at temperatures above about 200° C., a siloxane formulation which preferably includes three types of filler particles, namely: strength-enhancing solid particles, thermal-conductivity-enhancing solid particles, and microsphere particles in unexpanded or expanded microballoon form, in a manner as described above for BCL 14 of fuser roller 10.

Thus the walls of the microspheres used for BCL 24 are preferably made from a polymeric material polymerized as a homopolymer or as a copolymer from one or more of the following group of monomers: acrylonitrile, methacrylonitrile, acrylate, methacrylate, and vinylidene chloride. However, any suitable monomer may be used.

The walls of microspheres useful for making BCL 24, i.e., expanded microballoon particles or unexpanded microspheres, can include finely divided solid particles. Inorganic particles, e.g., oxide particles, or any other suitable finely divided inorganic particles, can be included in the walls. Preferred oxide particles are silica particles. Additionally or alternatively, the microsphere walls may include finely divided organic polymeric particles.

Certain preferred embodiments of BCL 24 are made by inclusion of expanded microballoons in the uncured formulations, in the manner described above for making BCL 14 of fuser roller 10 (i.e., with unexpanded microspheres preferably excluded). Various sizes of microballoon particles can be used as may be suitable.

For making alternative preferred embodiments of BCL 24 of pressure roller 20, the corresponding alternative uncured formulations include unexpanded microspheres (i.e., with expanded microballoons preferably excluded). A wide variety of tailored size distributions can be assembled and employed in these alternative uncured formulations.

Predetermined microsphere concentrations in an uncured organosiloxane formulation for making BCL 24 preferably are in a range of approximately between 0.25%–4% by weight (w/w), and more preferably, 0.5%–2% weight (w/w).

Any suitable volume percentage of microspheres may be used in the uncured organosiloxane formulation for BCL 24. Moreover, any suitable sizes of expanded microballoons (or alternatively unexpanded microspheres) can be used, having either one mean size or a combination of sizes. If expanded balloon microspheres are used, the volume percentage in the uncured organosiloxane formulation can be large, typically in a range of approximately between 30%–90% by volume (v/v).

A preferred concentration by weight of strength-enhancing solid particles (sometimes referred to as structural fillers) in an uncured organosiloxane formulation for making BCL 24 is in a range of approximately between 5%–10% weight (w/w). Any suitable volume percentage of strength-enhancing solid particles may be used in the uncured organosiloxane formulation for making BCL 24.

A preferred concentration by weight of thermal-conductivity-enhancing solid particles in an uncured organosiloxane formulation for making BCL 24 is in a range of approximately between 40%–70% weight (w/w). Any suitable volume percentage of thermal-conductivity-enhancing solid particles may be used in the uncured organosiloxane formulation for making BCL 24.

In an alternative embodiment to pressure roller 20, solid filler particles having primarily a strength-enhancing property are included in an uncured formulation for making BCL 24, and solid filler particles having primarily a thermal-conductivity-enhancing property are omitted.

Preferred for BCL 24 are strength-enhancing solid filler particles and thermal-conductivity-enhancing solid filler particles of similar types and having similar sizes as preferably used for BCL 14.

The base cushion layer 24 preferably has a thermal conductivity in a range of approximately between 0.1 BTU/hr/ft/° F.–0.2 BTU/hr/ft/° F.

Base cushion layer 24 preferably has a Shore A durometer in a range of approximately between 30–50.

Base cushion layer 24 preferably has a thickness in a range of approximately between 0.01 inches–0.30 inches, and more preferably, in a range of approximately between 0.1 inches–0.2 inches.

It is preferred that the protective layer 22 of pressure roller embodiment 20 is made of a fluoroelastomer, which can include solid filler particles. Preferably, protective layer 22 is similar in all respects to layer 12 of fuser roller 10.

A preferred relatively hard fuser roller (not illustrated) for use with pressure roller 20 includes a core member with a base cushion layer preferably formed on the core member and a topcoat layer on the base cushion layer. The core member of the relatively hard fuser roller is preferably an aluminum cylinder having an outer diameter in a range of between about 4 inches and 6.4 inches. The base cushion layer of the relatively hard fuser roller preferably has a thickness in a range of approximately between 0.075 inches and 0.125 inches. The thermal conductivity of the base cushion layer is preferred to be in a range of approximately between 0.30 BTU/hr/ft/° F. and 0.36 BTU/hr/ft/° F. A preferred base cushion layer of the relatively hard fuser roller is made of an elastomeric material preferably having a Shore A durometer in a range of approximately between 60–75, and more preferably in a range of approximately between 70–75. The base cushion layer preferably includes a thermal-conductivity-enhancing particulate filler. Preferably, the base cushion layer is made of a cross-linked polydimethylsiloxane elastomer. The topcoat layer, preferably having a thickness in a range of approximately between 0.0015 inches–0.0040 inches, is preferably made of a fluoropolymer, such as for example the fluorocarbon thermoplastic random copolymer material made from copolymerized vinylidene fluoride, tetrafluoroethylene and hexafluoropropylene as disclosed in U.S. Pat. Nos. 6,355,352 and 6,429,249, both in the name of Chen, et al. The relatively hard fuser roller can be heated for fusing in any known manner, e.g., using an internal heat source and/or an external heat source. In an alternative embodiment of the relatively hard fuser roller, there is no base cushion layer, the core member being preferably made of any rigid material having a suitably high thermal conductivity and the core member coated with a suitable layer such as a wear-resistant layer, the wear-resistant layer preferably made of any material stable at high temperatures and resistant to damage by fuser oil.

A fusing station including the above-described embodiment relatively hard fuser roller and the compliant pressure roller 20 advantageously provides increased fusing station efficiency (throughput) and greatly reduces a frequency of wrinkling of receiver members passing through the fusing nip. This improved performance is due to a lowered modulus (Shore A durometer) resulting from hollow microballoons incorporated into base cushion layer 24. In addition to these advantages, pressure roller 20 has a relatively simple construction.

Described in Example 1 below are highly cross-linked condensation-polymerized polydimethylsiloxane materials, made from uncured formulations including expanded hollow microballoon particles and also including solid strength-enhancing filler particles and solid thermal-conductivity-enhancing filler particles. For Example 1, expanded hollow microballoon particles in amounts of up to 1.0% by weight (w/w) (about 63% by volume) were added to pre-cured formulations, resulting in post-cured materials having substantially lower tensile modulus than condensation-polymerized control materials which contain no added microballoon particles. It has been remarkably found that, within expected experimental variation, these observed reductions of tensile modulus are not accompanied by any significant drop in thermal conductivity (measured under negligible compression). This is very surprising because of the large void volume enclosed by the hollow microballoons. Similarly large void volumes can be present in foamed materials, but the thermal conductivity behavior is different. For example, a closed-cell foam having a high void concentration is typically found to have a much lower thermal conductivity (measured under negligible compression) than the material of the continuous phase in solid form. On the other hand, it is demonstrated by Example 1 that inclusion of microballoon hollow filler particles can provide resilient base cushion layer materials which are advantageously considerably softer than prior art base cushion layer materials while retaining thermal conductivities comparable with the prior art condensation-polymerized materials.

EXAMPLE 1

Microballoons in a Condensation-Polymerized Polydimethylsiloxane Material

Uncured formulations were made as follows: Quantities of hollow microballoons, available as DE 092 particles from Expancel, located in Sundsvall, Sweden and Duluth, Ga., were stirred at room temperature into aliquots of an uncured red rubber formulation Stycast® 4952 (a cross-linkable polydimethylsiloxane, including aluminum oxide and iron oxide fillers, available from the Silicones Division of Emerson and Cuming, a subsidiary of W. R. Grace and Company), with each aliquot including about 0.25% by weight (w/w) of Catalyst 50 (from DuPont). The DE 092 particles are flexible hollow microballoons approximately 120 micrometers in diameter, having walls made of a copolymer of polyacrylonitrile and polymethacrylonitrile, the walls incorporating 3%–8% weight (w/w) finely divided silica. The flexible hollow microballoons were manufactured in expanded form by thermal expansion of unexpanded microspheres by Expancel, located in Sundsvall, Sweden and Duluth, Ga. Cured samples 1–4, including a control sample having no added microballoon particles, were made as indicated in columns 1, 2, and 3 of Table 1. The uncured formulation for each sample was injected into a mold for making a sample plaque, left overnight, and then demolded. Demolded plaque samples were then cured with a 12-hour ramp to 205° C. followed by an 18-hour hold at 205° C., and then slowly cooled to room temperature. The resulting condensation-polymerized sample plaques were characterized by measuring the thermal conductivity, Shore A durometer, and tensile modulus (see Table 1). Tensile modulus was measured using a Rheometrics RSA II Dynamic Mechanical Analyzer (DMA) apparatus.

TABLE 1

Cured Stycast ® 4952 Materials Including Microballoons

| Sample No. | Stycast ® 4952 (grams) | DE 092 Particles (grams) | Microballoon Percentage (w/w) | Thermal Conductivity (BTU/ft/hr/° F.) | Durometer Shore A | DMA Modulus (Megapascal) 139° C. | DMA Modulus (Megapascal) 176° C. |
|---|---|---|---|---|---|---|---|
| 1 | 200 | 0 | 0.0 | 0.387 | 64 | 4.32 | 4.36 |
| 2 | 200 | 0.5 | 0.25 | 0.367 | 59 | 4.68 | 4.92 |
| 3 | 200 | 1 | 0.5 | 0.348 | 57 | 4.18 | 4.34 |
| 4 | 200 | 2 | 1.0 | 0.370 | 49 | 2.74 | 4.18 |

Figure 3:
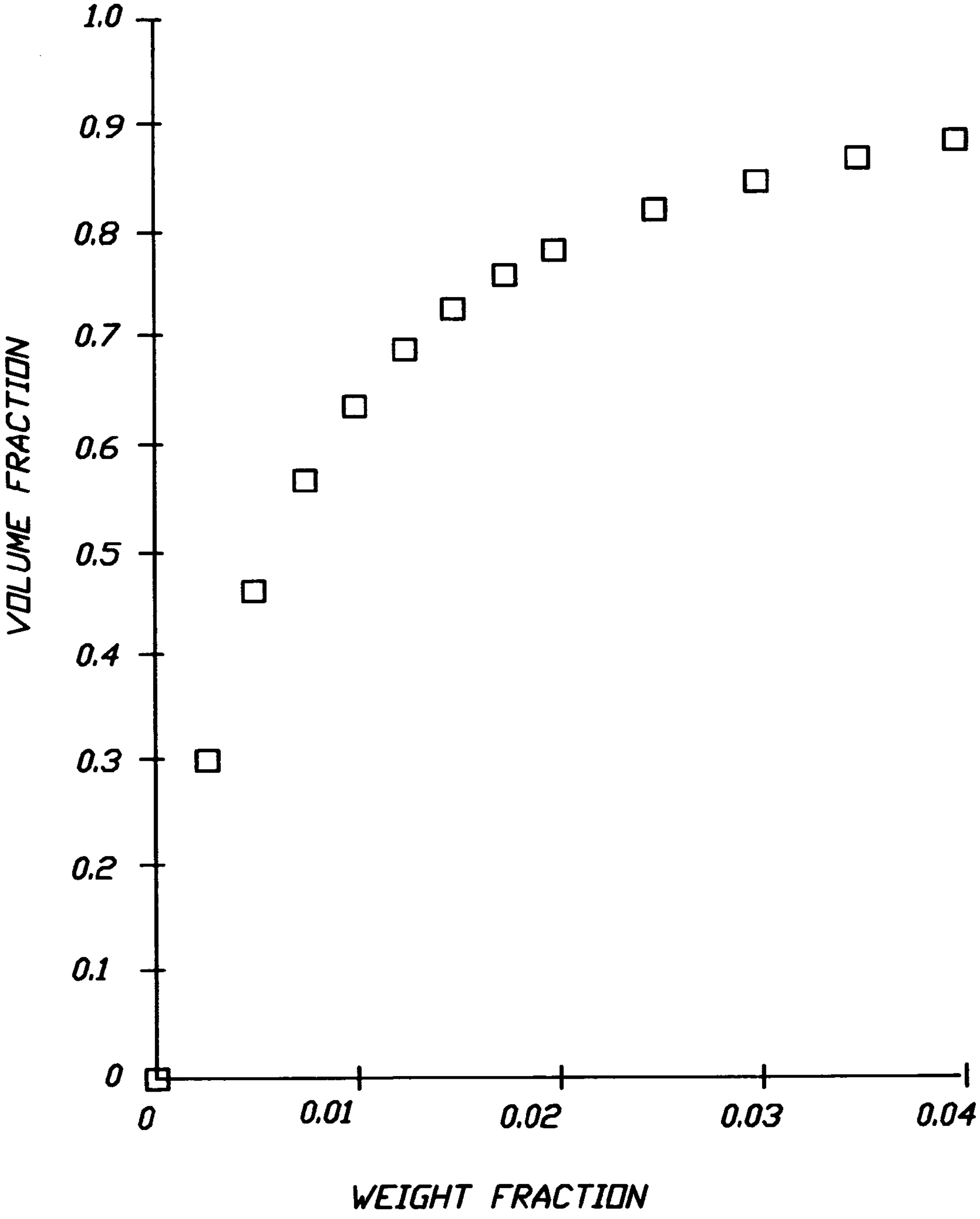
FIG. 3 shows a graph, relevant to uncured formulations described in Example 1, in which volume fraction of hollow microballoons is plotted as a function of weight fraction of hollow microballoons.

In the graph of FIG. 3, which shows the calculated volume fraction as a function of the weight fraction of microballoons in the uncured formulations, the calculated volume fractions of Expancel® DE 092 microballoons in uncured formulations having the same ingredients as used to make Samples Nos. 1–4 of Table 1 are also included. As illustrated in FIG. 3, large volume fractions of the microballoons correspond to very small weight fractions, i.e., a weight fraction of 0.005 (0.5% w/w) is equivalent to a volume fraction of 0.46 (46% v/v) in an uncured formulation.

Figure 4:
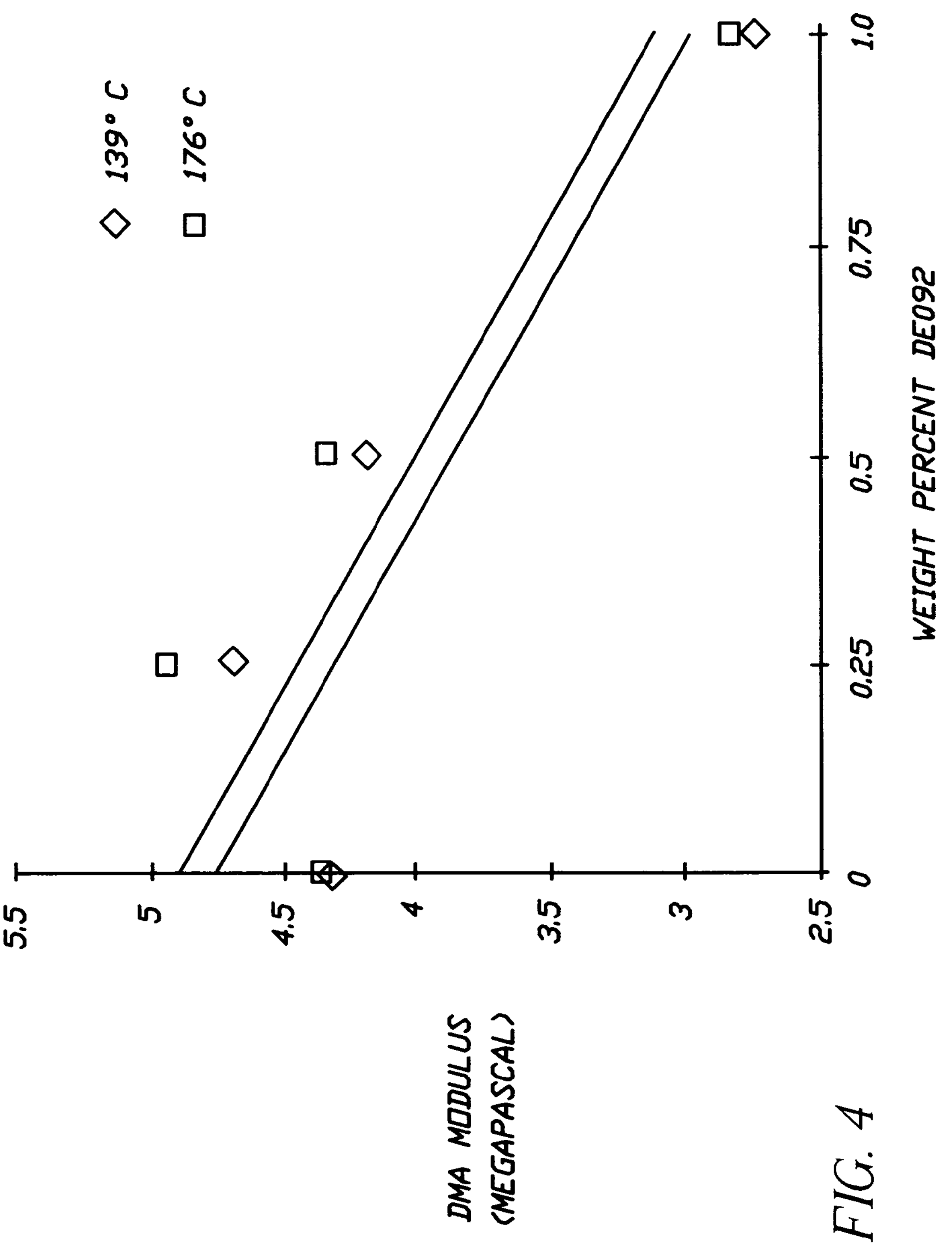
FIG. 4 shows, for a cured formulation suitable for use in a fusing-station member of the invention, a graph of tensile modulus versus weight percent of hollow microballoons in the corresponding uncured formulation.
Figure 5:
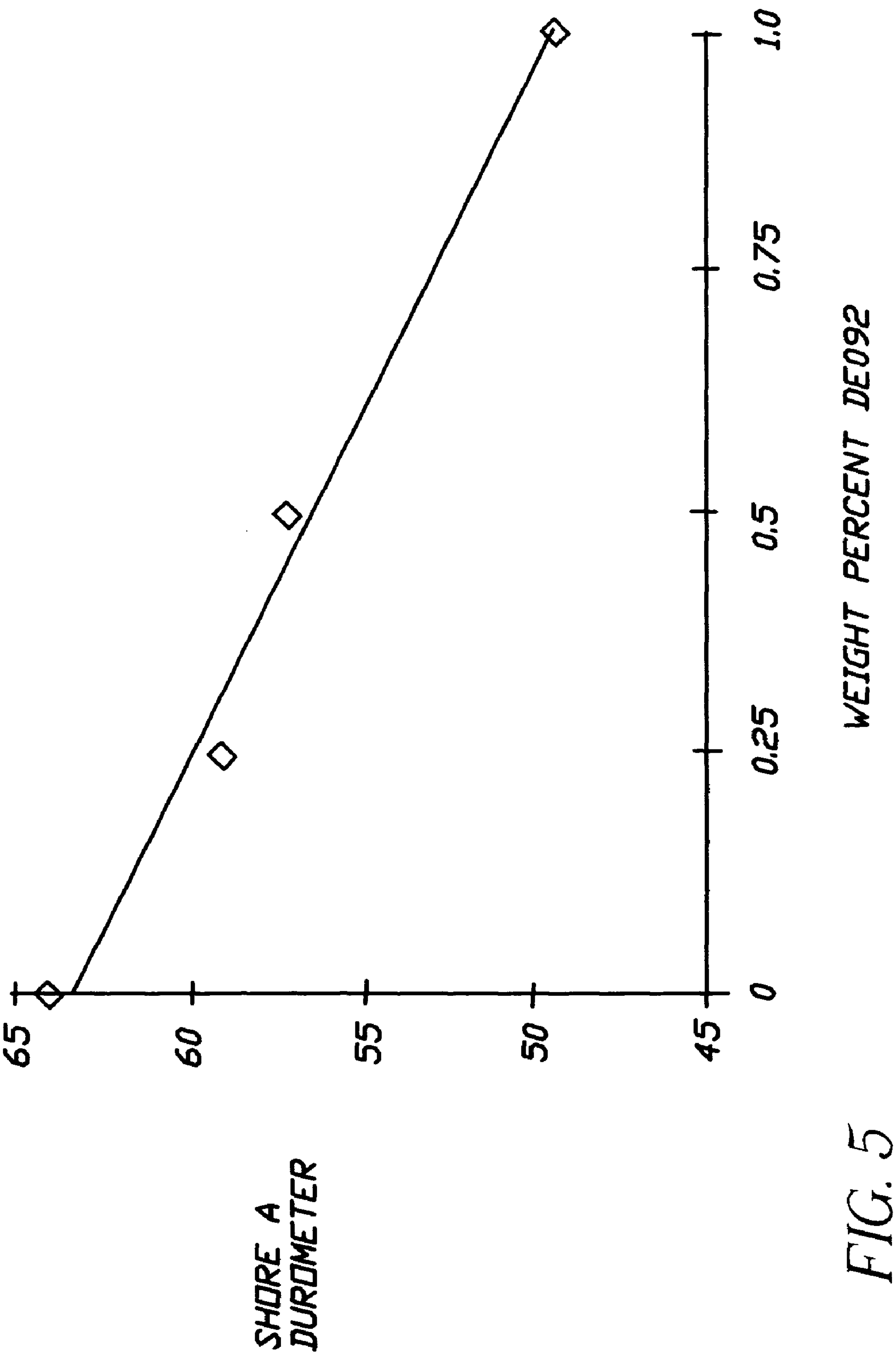
FIG. 5 shows, for a cured formulation suitable for use in a fusing-station member of the invention, a graph of Shore A durometer versus weight percent of hollow microballoons in the corresponding uncured formulation.

In Table 1, as the weight percent of Expancel® DE 092 particles in the uncured formulation (column 4) was increased, i.e., from zero in Sample 1 (control sample) to 1.0% w/w in Sample 4, the DMA modulus (measured at both 139° C. and 176° C.) showed a strong tendency to decrease. This is clearly shown by the data plotted in FIG. 4, which includes solid lines that are least-squares fits to the data in Table 1. As expected, a plot of the Shore A durometer data in FIG. 5 confirms the finding that the cured plaques become progressively softer as up to 1% by weight of microballoon particles are added to the uncured formulation.

Figure 6:
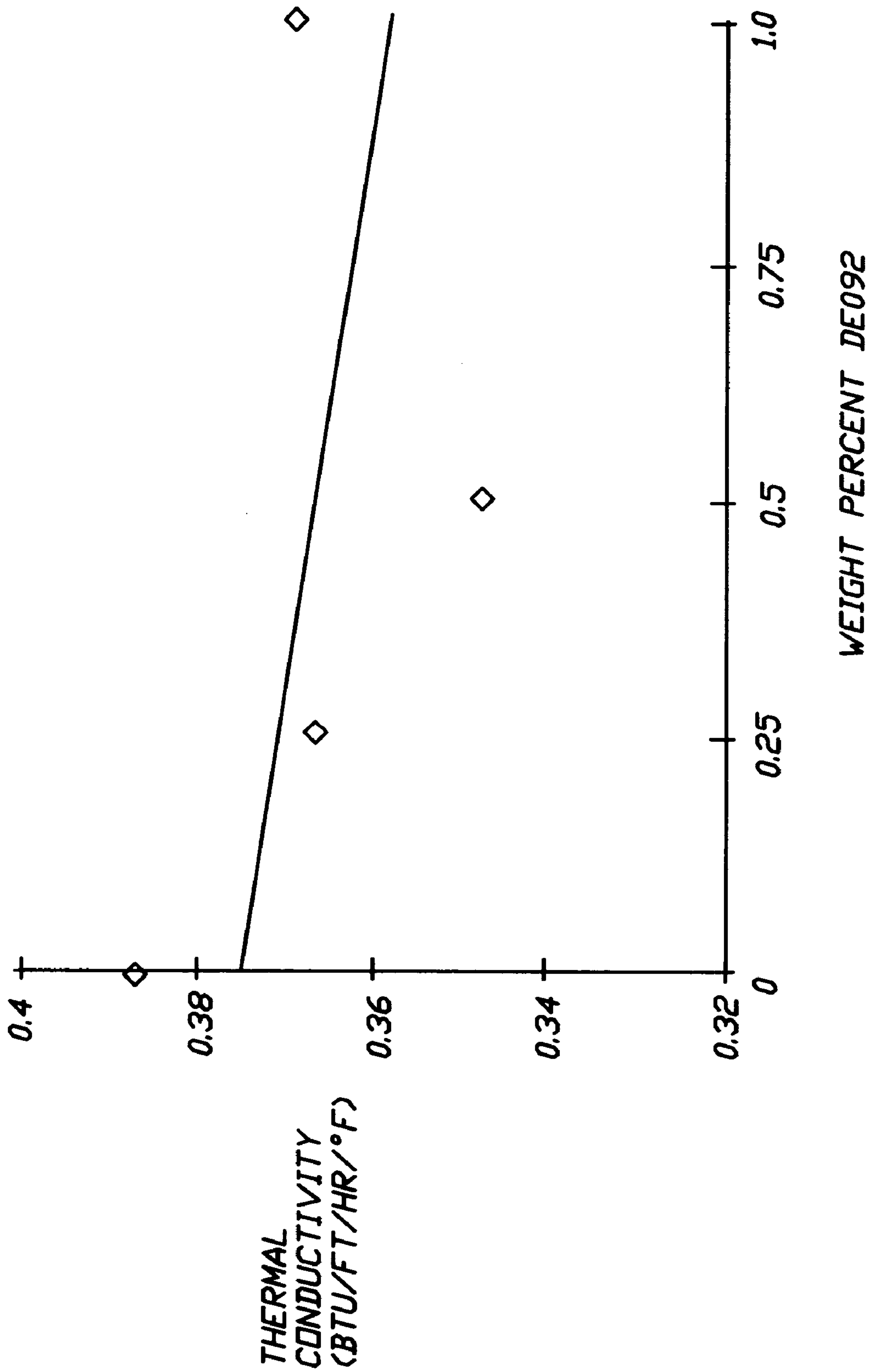
FIG. 6 shows, for a cured formulation suitable for use in a fusing-station member of the invention, a graph of thermal conductivity versus weight percent of hollow microballoons in the corresponding uncured formulation.

Also it may be seen from Table 1 that as the weight percent of Expancel® DE 092 particles in the uncured formulation (column 4) was increased, i.e., from zero in Sample 1 (control sample) to 1.0% weight (w/w) in Sample 4, the measured thermal conductivity (column 5) did not change significantly. Thermal conductivity was measured using a thermal conductivity analyzer obtained from the Holometric Corporation (model TCA-100) in accordance with the guarded heat flow method described in ASTM-F433-77. The applied load was small so as to minimize compression of the samples, and for each sample the initial thickness of the sample (i.e., prior to mounting in the measuring unit) was used to calculate the thermal conductivity. Nevertheless, in view of the large volume percentages of the microballoons, a very limited amount of compression (which was not measured) did in fact occur. This compression was not noticeable by eye for all the samples. FIG. 6 shows a graph of the thermal conductivity data of Table 1, in which the solid line is a least squares fit to the data. The considerable scatter of the points, which have an estimated accuracy of about ±0.01 BTU/ft/hr/° F., means that the slight slope of this line is not meaningful, and it may be safely concluded that the thermal conductivity of the cured samples does not change significantly when up to 1.0% by weight of microballoons are incorporated into the uncured formulations.

Example 1 teaches the surprising result that, without incurring a penalty of a reduced thermal conductivity, the softness of a condensation-polymerized base cushion silicone rubber can be substantially increased by the inclusion of a large volume percent of microballoons. This result is contrary to expectation, because by analogy with materials such as uncompressed foams in which thermal conductivity is typically lower than that of the solid phase, the inclusion of the microballoons might instead have reasonably been expected to produce a reduced thermal conductivity.

EXAMPLE 2

COMPARATIVE EXAMPLE

Reactive PDMS Oil Incorporated in a Polydimethylsiloxane Material

Example 2 is a comparative example to illustrate the effect of adding various quantities of a reactive relatively low molecular weight polydimethylsiloxane (PDMS) oil to uncured formulations for making condensation-polymerized silicone rubber materials, with the objective of thereby lowering the tensile modulus. An uncured formulation containing no added oil was a control sample entirely similar to the formulation used to make Sample 1 of Table 1 above. The reactive polydimethylsiloxane oil is available as DC3-0133 (from Dow Corning Corporation of Midland, Mich.) and is hydroxy-terminated so as to react during the curing process with silane groups on the high molecular weight polydimethylsiloxane molecules of the Stycast® 4952 material, thereby binding the oil molecules into the cured materials. Thus the bound oil molecules can be considered to act as a "filler". A nonreactive PDMS oil was used in the silicone rubber materials as disclosed in U.S. Pat. No. 5,654,052, in the name of Visser, et al.

TABLE 2

Cured Stycast ® 4952 Materials Reacted with a Low Molecular Weight PDMS Oil

| Sample No. | DC3-0133 Percent (w/w) | Thermal Conductivity (BTU/ft/hr/° F.) | Durometer Shore A |
|---|---|---|---|
| 1 | 0 | 0.348 | 58 |
| 2 | 2 | 0.328 | 55 |
| 3 | 5 | 0.306 | 53 |
| 4 | 7 | 0.290 | 47 |
| 5 | 10 | 0.268 | 43 |

The data in Table 2 show that as larger and larger amounts of DC3-0133 are incorporated into the cured silicone rubber, both the thermal conductivity and the Shore A durometer show parallel steady declines. For the maximum amount of included DC3-0133, i.e., 10% by weight, the Shore A durometer declined by 26% and the thermal conductivity declined by 23% from the control values (line 1 of Table 2).

By contrast, addition of 1.0% of microballoons to an uncured formulation (last line of Table 1 of Example 1) caused a 23% reduction in the Shore A durometer, but there was no statistically significant change in the thermal conductivity. Thus, in consideration of the results of Example 2, the results of Example 1 are unexpected and surprising.

An exemplary compliant fuser roller according to the invention can be prepared as follows: A cylindrical aluminum core member of a suitable diameter, e.g., about 6.0 inches OD, is cleaned and dried. A mixture of about 400 parts by weight of Stycast® 4952 and about 1 part by weight of Catalyst 50 is degassed and injection-molded on the core member and dried. The roller is then cured with an approximately 12-hour ramp to 205° C. followed by an approximately 18-hour hold at 205° C., then slowly cooled to room temperature and demolded. The base cushion layer is then suitably smoothed, e.g., by grinding, and then exposed to a corona discharge for about 15 minutes at about 750 watts, after which a fluoroelastomer gloss control outer layer is then directly applied. An exemplary gloss control layer is formed on the base cushion layer as follows. 100 parts by weight (w/w) of fluorocarbon thermoplastic random copolymer THV 200A, 10 parts w/w of fluorinated resin, 7.44 parts w/w of zinc oxide particles having diameter of approximately 7 μm, and 7 parts w/w aminosiloxane are mixed. THV200A is a commercially available fluorocarbon thermoplastics random copolymer which is sold by 3M® Corporation. The zinc oxide particles can be obtained from a convenient commercial source, e.g., Atlantic Equipment Engineers of Bergenfield, N.J. The aminosiloxane is preferably Whitford's Amino, an amine-functionalized PDMS oil commercially available from Whitford. The fluorinated resin is preferably fluoroethylenepropylene (FEP), commercially available from Dupont. The ingredients are mixed with 1 part w/w of dibutyl-tin-diacetate catalyst such as Catalyst 50 (from Dupont) on a two-roll mill, then dissolved to form a 25 weight percent solids solution in methyl ethyl ketone. The resulting material is ring coated onto the cured base cushion layer, air dried for 16 hours, baked with 2.5 hour ramp to 275° C., held at 275° C. for 30 minutes, then held 2 hours at 260° C. and cooled slowly to room temperature. The ring coating and curing procedure can be repeated multiple times using the methyl ethyl ketone solution, resulting after for example two repetitions in an outer gloss control layer of fluorocarbon random copolymer having a thickness of about 0.002 inches.

A general method of making a fusing-station member for use in a fusing station of an electrostatographic machine is now described. The fusing-station member is formed from a substrate, a condensation-polymerized base cushion layer adhered to the substrate and a protective layer coated on the base cushion layer, the method including the steps of: mixing of ingredients so as to produce an uncured formulation, the ingredients including a silanol-terminated polyorganosiloxane, about 0.2%–0.5% by weight of dibutyl-tin-diacetate catalyst, microsphere particles, strength-enhancing solid filler particles, and thermal-conductivity-enhancing solid filler particles, wherein the microsphere particles have a concentration in the uncured formulation of about 0.25%–4% by weight (w/w); degassing the uncured formulation; contacting the substrate with a thermally curable layer of the uncured formulation, the substrate priorly coated with a uniform coating of an adhesive primer, the contacting coincident with forming the thermally curable layer with a uniform thickness on the substrate; ramp heating the thermally curable layer and the substrate from a room temperature to an elevated temperature, the elevated temperature exceeding about 180° C.; continuing to heat the thermally curable layer and the substrate at a temperature exceeding 180° C. until the thermally curable layer is fully cured via a condensation-polymerization reaction; cooling the thermally curable layer and the substrate to a room temperature so as to obtain the base cushion layer as a condensation-polymerized layer adhered to the substrate; and coating the protective layer on the base cushion layer.

In the above method, the silanol-terminated polyorganosiloxane can be a silanol-terminated polydimethylsiloxane, which includes silanol pendant side chains, and the microsphere particles included in the uncured formulation are preferably unexpanded microspheres or expanded microballoons.

The method can be applied to making the fusing-station member as a roller, either as a fuser roller or as a pressure roller, wherein the substrate is a rigid cylindrical core member and wherein the aforementioned contacting involves injecting the uncured formulation into a cylindrical mold concentric with the rigid cylindrical core member.

The method can alternatively be applied to making the fusing-station member in the form of a web, the aforementioned substrate included in the web.

In summary, the invention provides improved compliant fuser rollers or pressure rollers of simple construction, the rollers inclusive of condensation-polymerized base cushion layers incorporating microsphere particles. The microsphere particles are preferably either unexpanded microspheres which are thermally expandable during thermal curing of the base cushion layer, or are expanded microballoons. By comparison with prior art rollers which do not include microsphere particles, the compliant fusing-station rollers of the invention provide relatively softer rollers (i.e., lower Shore A durometer) having thermal conductivities surprisingly not lower than those of the prior art rollers. Thus fusing-station rollers of the invention can provide wider fusing nips (i.e., longer fusing times) with nip pressures similar to those used for fusing stations employing prior art rollers not incorporating microsphere particles, thereby increasing fusing productivity. Alternatively, with throughput of fused receiver members through the fusing station similar to that using a prior art compliant fusing-station roller, the fusing nip pressure can be reduced with no loss of productivity, thereby reducing fusing artifacts such as wrinkles as well as reducing mechanical damage to the roller such as caused by the edges of receiver members.

The invention has been described in detail with particular reference to certain preferred embodiments thereof, but it will be understood that variations and modifications can be effected within the spirit and scope of the invention.

What is claimed is:

1. For use in a fusing station of an electrostatographic machine, an elastically deformable fusing-station roller, said fusing-station roller comprising:

a core member, said core member being rigid and having a cylindrical outer surface;

a base cushion layer, said base cushion layer formed on said core member;

a protective layer coated on said base cushion layer;

wherein said base cushion layer is a thermally cured polyorganosiloxane material made at an elevated temperature by a condensation-polymerization of an uncured formulation, said base cushion layer having a thermal conductivity in a range of approximately between 0.2 BTU/hr/ft/° F.–0.5 BTU/hr/ft/° F.;

wherein said uncured formulation includes microsphere particles, said microsphere particles having flexible walls;

wherein said microsphere particles have a predetermined microsphere concentration in said uncured formulation; and wherein said uncured formulation further includes solid filler particles.

2. The fusing-station roller of claim 1, wherein a type of solid filler particles includes strength-enhancing filler particles.

3. The fusing-station roller of claim 2, wherein said strength-enhancing filler particles are members of a group including particles of silica, zirconium oxide, boron nitride, silicon carbide, and tungsten carbide.

4. The fusing-station roller of claim 2, wherein said strength-enhancing filler particles have a concentration in said uncured formulation in a range of approximately between 5%–10% by weight (w/w).

5. The fusing-station roller of claim 1, wherein a type of solid filler particles includes thermal-conductivity-enhancing filler particles.

6. The fusing-station roller of claim 5, wherein said thermal-conductivity-enhancing filler particles are selected from a group including particles of aluminum oxide, iron oxide, copper oxide, calcium oxide, magnesium oxide, nickel oxide, tin oxide, zinc oxide, graphite, carbon black, and mixtures thereof.

7. The fusing-station roller of claim 5, wherein said thermal-conductivity-enhancing filler particles have a concentration in said uncured formulation in a range of approximately between 40%–70% by weight (w/w).

8. The fusing-station roller of claim 1, wherein said microsphere particles which are included in said uncured formulation are hollow microballoons, said hollow microballoons distinguishable by at least one size.

9. The fusing-station roller of claim 8, wherein said hollow microballoons have diameters of up to approximately 120 micrometers.

10. The fusing-station roller of claim 8, wherein said hollow microballoons included in said uncured formulation have a concentration by volume in a range of approximately between 30%–90%.

11. The fusing-station roller of claim 1, wherein said microsphere particles are unexpanded microspheres, said unexpanded microspheres being expanded to hollow microballoons during said condensation-polymerization at said elevated temperature.

12. The fusing-station roller of claim 11, wherein said hollow microballoons have at least one distinguishable size.

13. The fusing-station roller of claim 1, wherein said predetermined microsphere concentration is in a range of approximately between 0.25%–4.0% by weight (w/w) in said uncured formulation.

14. The fusing-station roller according to claim 1, wherein said elevated temperature exceeds about 180° C.

15. The fusing-station roller of claim 1, wherein said flexible walls of said microsphere particles comprise a polymeric material, said polymeric material polymerized from monomers selected from the following group of monomers: acrylonitrile, methacrylonitrile, acrylate, methacrylate, vinylidene chloride, and combinations thereof.

16. The fusing-station roller of claim 1, wherein said flexible walls of said microsphere particles include finely divided particles selected from a group including inorganic particles and organic polymeric particles.

17. The fusing-station roller according to claim 1, wherein said base cushion layer comprises a cross-linked polydimethylsiloxane.

18. The fusing-station roller of claim 17, wherein a thickness of said base cushion layer is in a range of approximately between 0.1 inches–0.2 inches.

19. The fusing-station roller of claim 17, wherein said fusing-station roller is a fuser roller, said fuser roller being internally heated.

20. The fuser roller of claim 19, wherein a thickness of said base cushion layer is in a range of approximately between 0.03 inches–0.3 inches.

21. The fuser roller of claim 19, wherein a Shore A durometer of said base cushion layer is in a range of approximately between 30–75.

22. The fuser roller of claim 21, wherein a Shore A durometer of said base cushion layer is in a range of approximately between 50–70.

23. The fusing-station roller of claim 17, wherein said fusing-station roller is a pressure roller.

24. The pressure roller of claim 23, wherein a thickness of said base cushion layer is in a range of approximately between 0.01 inches–0.3 inches.

25. The pressure roller of claim 23, wherein a Shore A durometer of said base cushion layer is in a range of approximately between 30–50.

26. The fusing-station roller according to claim 1, wherein said protective layer comprises a chemically unreactive, low surface energy, flexible, polymeric material suitable for high temperature use.

27. The fusing-station roller according to claim 1, wherein said solid filler particles have a mean diameter in a range of approximately between 0.1 micrometers–100 micrometers.

28. The fusing-station roller according to claim 27, wherein said solid filler particles have a mean diameter in a range of approximately between 0.5–40 micrometers.

29. For use in a fusing station of an electrostatographic machine, an elastically deformable fusing-station roller, said fusing-station roller comprising:

a core member, said core member being rigid and having a cylindrical outer surface;

a base cushion layer, said base cushion layer formed on said core member;

a protective layer coated on said base cushion layer;

wherein said base cushion layer is a thermally cured polyorganosiloxane material made at an elevated temperature by a condensation-polymerization of an uncured formulation, said base cushion layer having a thermal conductivity in a range of approximately between 0.2 BTU/hr/ft/° F.–0.5 BTU/hr/ft/° F.;

wherein said uncured formulation includes microsphere particles, said microsphere particles having flexible walls;

wherein said microsphere particles have a predetermined microsphere concentration in said uncured formulation;

wherein said uncured formulation further includes solid filler particles;

wherein said protective layer comprises a chemically unreactive, low surface energy, flexible, polymeric material suitable for high temperature use; and wherein said protective layer is a gloss control layer;

a thermal conductivity of said gloss control layer is in a range of approximately between 0.07 BTU/hr/ft/° F.–0.11 BTU/hr/ft/° F.; and a thickness of said gloss control layer is in a range of approximately between 0.001 inches–0.004 inches.

30. The fusing-station roller of claim 29, wherein said gloss control layer comprises a fluoropolymer.

31. The fusing-station roller of claim 30, wherein said fluoropolymer is a random copolymer, said random copolymer made of monomers of vinylidene fluoride ($CH_2CF_2$), hexafluoropropylene ($CF_2CF(CF_3)$), and tetrafluoroethylene ($CF_2CF_2$), said random copolymer having subunits of:

$$—(CH_2CF_2)x\text{-},—(CF_2CF(CF_3))y\text{-}, \text{ and } —(CF_2CF_2)z\text{-},$$

wherein;

x is from 1 to 50 or from 60 to 80 mole percent of vinylidene fluoride;

y is from 10 to 90 mole percent of hexafluoropropylene;

z is from 10 to 90 mole percent of tetrafluoroethylene; and x+y+z equals 100 mole percent.

32. The fusing-station roller of claim 31, wherein:

said gloss control layer comprises a particulate filler;

said particulate filler has a particle size in a range of approximately between 0.1 μm–10 μm;

said particulate filler has a total concentration in said gloss control layer of less than about 20% by weight;

said particulate filler includes zinc oxide particles and fluoroethylenepropylene resin particles;

said zinc oxide particles have a concentration in a range of approximately between 5%–7% by weight (w/w); and said fluoroethylenepropylene resin particles have a concentration in a range of approximately between 7%–9% by weight (w/w).

33. For use in a fusing station of an electrostatographic machine, an elastically deformable fusing-station member, said elastically deformable fusing-station member comprising:

a substrate;

a base cushion layer, said base cushion layer formed on said substrate;

a protective layer coated on said base cushion layer;

wherein said base cushion layer is a thermally cured polyorganosiloxane material made by a condensation-polymerization of an uncured formulation, said base cushion layer having a thermal conductivity in a range of aproximately between 0.2 BTU/hr/ft/° F.–0.5 BTU/hr/ft/° F.;

wherein said uncured formulation includes microsphere particles, said microsphere particles having flexible walls;

wherein a form of said microspheres includes at least one of a pre-expanded microballoon form and an unexpanded microsphere form;

wherein said microsphere particles have a predetermined microsphere concentration in said uncured formulation; and wherein said uncured formulation further includes solid filler particles.

34. The elastically deformable fusing-station member of claim 33, wherein said condensation-polymerization of said uncured formulation is carried out at an elevated temperature exceeding 180° C.

* * * * *